United States Patent
Mühlin et al.

(10) Patent No.: US 8,043,656 B2
(45) Date of Patent: Oct. 25, 2011

(54) METHOD AND APPARATUS FOR IMPREGNATING A LINING MODULE PROVIDED WITH A RESIN-ABSORBING LAYER

(75) Inventors: Michael Mühlin, Erkelenz (DE);
Andreas Bichler, Ebbs/Tirol (AT)

(73) Assignee: Trelleborg Pipe Seals Duisburg GmbH, Duisburg (DE)

( * ) Notice: Subject to any disclaimer, the term of this patent is extended or adjusted under 35 U.S.C. 154(b) by 184 days.

(21) Appl. No.: 12/612,742

(22) Filed: Nov. 5, 2009

(65) Prior Publication Data
US 2010/0108238 A1    May 6, 2010

(30) Foreign Application Priority Data
Nov. 5, 2008 (DE) .......... 10 2008 055 943

(51) Int. Cl.
*B05D 7/22* (2006.01)
(52) U.S. Cl. ........ 427/230; 427/238; 427/350; 427/294; 156/293; 156/187
(58) Field of Classification Search .......... 156/187, 156/293; 427/230, 238, 350, 294
See application file for complete search history.

(56) References Cited

U.S. PATENT DOCUMENTS

| | | |
|---|---|---|
| 4,009,063 A | 2/1977 | Wood |
| 4,366,012 A | 12/1982 | Wood |
| 5,915,419 A | 6/1999 | Tweedie et al. |
| 6,054,180 A | 4/2000 | Kamiyama et al. |
| 2005/0255240 A1* | 11/2005 | Okamoto et al. ............. 427/230 |

FOREIGN PATENT DOCUMENTS

| | | |
|---|---|---|
| DE | 101 48 258 A1 | 4/2003 |
| DE | 697 27 295 T2 | 11/2004 |
| EP | 1426671 A1 | 6/2004 |

OTHER PUBLICATIONS

European Search Report dated Feb. 7, 2011.

* cited by examiner

*Primary Examiner* — Jeff Aftergut
*Assistant Examiner* — Jaeyun Lee
(74) *Attorney, Agent, or Firm* — Laurence A. Greenberg; Werner H. Stemer; Ralph E. Locher

(57) ABSTRACT

A method and an apparatus impregnate a lining module for repairing a pipe. An end area of the lining module provided with a resin-absorbing layer and an air-tight, outer coating, is introduced into an air-tight sleeve, and an auxiliary introduction device is fixed at an introduction area of the lining module. The transitions between the lining module and the sleeve and between the introduction area and the auxiliary introduction device are closed off in an air-tight manner by at least one sealing device. The auxiliary introduction device is closed off with respect to the ambient by a releasable blocking device in an air-tight manner in such a way that the chamber, formed by the sleeve and the auxiliary introduction device and optionally also the lining module, is closed in an air-tight manner and an introduction chamber accessible from the outside is provided for filling with resin.

11 Claims, 4 Drawing Sheets

METHOD AND APPARATUS FOR IMPREGNATING A LINING MODULE PROVIDED WITH A RESIN-ABSORBING LAYER

CROSS-REFERENCE TO RELATED APPLICATION

This application claims the priority, under 35 U.S.C. §119, of German patent application No. 10 2008 055 943.1-24, filed Nov. 5, 2008; the prior application is herewith incorporated by reference in its entirety.

BACKGROUND OF THE INVENTION

Field of the Invention

The present invention relates to a method and apparatus for impregnating a lining module provided with a resin-absorbing layer which is used for repairing a pipe.

From the prior art, various methods are known for impregnating such a lining module for a pipe. In U.S. Pat. No. 4,009,063, a method is disclosed for introducing a resin via two nozzles into a tube-shaped hose. The resin to be introduced is supplied via a reservoir and pumps.

Published, non-prosecuted German patent application DE 101 48 258 A1 describes an impregnating system for impregnating a module with resin, wherein the module is introduced into an impregnating funnel and drawn out from a section embracing the module. The resin is pressed onto the module under pressure so that the fabric strip of the module is completely impregnated with resin. The resin can be selectively pressed onto the module, for example, with the aid of an injection nozzle.

Furthermore, U.S. Pat. No. 5,915,419 A discloses a method for impregnating a hat-shaped sealing module with resin. First, the module is introduced into a container, in which resin is present. The container is preferably of a transparent material. In the area of an opening of the container, a vacuum hose is introduced and closed in an air-tight manner. The hose is connected to a vacuum pump to create a vacuum within the container. This results in the resin being drawn upward and the module thus being impregnated with the resin. Subsequently, the vacuum hose is removed and the container is sealed. Then, the thus sealed container is introduced into a second container and closed with a further seal. The second container is of an opaque material to prevent premature hardening of the resin.

Finally, U.S. Pat. No. 4,366,012 relates to a method for impregnating a layer of a resin-absorbing material with a hardenable resin. The resin can be introduced into the interior of the lining tube by a nozzle. Then, the outlet is closed and a vacuum is applied so that the lining hose contracts. Subsequently, a vacuum source is connected to the end of the lining hose via a tube, and the air is evacuated from the interior of the lining hose. As a consequence of evacuating the air, the resin permeates the felt material of the lining hose, achieving the desired impregnation.

It has been found as a drawback that in the above mentioned conventional methods the resin must either be introduced into the interior of the lining module to be impregnated in a complex manner or the resin is introduced into a sleeve, subsequently the lining module is completely introduced into the sleeve and finally a vacuum is applied, whereby a relatively high pressure differential to the ambient must be established.

SUMMARY OF THE INVENTION

It is accordingly an object of the invention to provide a method and an apparatus for impregnating a lining module provided with a resin-absorbing layer which overcome the above-mentioned disadvantages of the prior art methods and devices of this general type, wherein the impregnation process can be carried out by simple measures and with the least possible complexity and on site.

The method according to the invention impregnates a lining module provided with a resin-absorbing layer, which is used for repairing pipes. The method includes introducing at least one end area of the lining module provided with the resin-absorbing layer and with an air-tight outer coating into an air-tight sleeve. An auxiliary introduction device is attached on an introduction area of the lining module. The transitions between the lining module and the sleeve and between the introduction area and the auxiliary introduction device are air-tightly closed by at least one sealing device. The auxiliary introduction device is air-tightly closed with respect to the ambient atmosphere by a releasable blocking device in such a way that the chamber formed by the sleeve and the auxiliary introduction device and optionally also the lining module is closed in an air-tight manner and that an introduction chamber accessible from the ambient, is provided for the introduction of resin. Air is evacuated from the chamber in such a way that a first pressure value is present within the chamber. The resin is introduced into the introduction chamber, in which a second pressure value, different from the first pressure value, is present. The blocking device is released so that the resin is introduced from the introduction chamber into the chamber with the aid of the pressure differential between the first and the second pressure value and optionally also with the aid of gravitational force, and the resin-absorbing layer of the lining module is impregnated with resin.

The method according to the invention enables simple impregnation of the lining module provided for use in repairing a pipe, with few auxiliary devices, so that the method can be carried out on site without the aid of complex apparatuses. The only things needed are a sleeve, an auxiliary introduction device, a sealing device and a blocking device in order to impregnate the lining module with resin. These components form a kit which can be combined in a space-saving manner in a package. Furthermore, it is a particular advantage that the resin can be introduced into an introduction chamber in an area outside of the evacuated area, and subsequently the transition to the evacuated chamber, formed by the sleeve, the lining module and the auxiliary introduction device can be opened, and the resin can be sucked into the chamber by the pressure differential and optionally also with the aid of gravitational forces, and can enter the pores of the resin-absorbing layer. In contrast to the prior art, a relatively low vacuum is sufficient since it is not necessary for the vacuum to move the resin upwards into the resin-absorbing layer against the force of gravity.

In a preferred embodiment of the method, a flange or a first pipe end of the lining module forms the first end area and/or a collar or a second pipe end of the lining module forms the introduction area. Thus, in a lining module containing a flange and a collar, the flange can be introduced into the sleeve through an opening in the sleeve. Herein, only the flange may be introduced into the sleeve. In other words, the collar does not need to be introduced into the sleeve. Herein, it is advantageous if at least the collar is provided with an air-tight outer layer. In case a first pipe end forms the first end area and the second pipe end forms the introduction area, the lining area preferably has a T-shape for use in a lateral connection to a main line.

In a preferred embodiment of the method, the attachment of the auxiliary introduction device to the introduction area of the lining module includes inserting the auxiliary introduction device into the introduction area. A filler neck, in particular in the form of a hollow body, is advantageously used as the auxiliary introduction device. The auxiliary introduction device and/or the sleeve can be formed of a plastic foil, for example. The sleeve and the auxiliary introduction device can thus be packaged in a flat shape.

An adhesive band is preferably used as the sealing device and/or at least one clamp is used as the blocking device. These devices are formed and/or are attachable in such a way that an air-tight closure can be achieved.

To form the introduction chamber, the auxiliary introduction device and the blocking device are used. The blocking device can include a plurality of parts, such as two or more chambers. Preferably, a filler neck is used as the auxiliary introduction device and two clamps are used as the blocking device. To this end, the filler neck is partially inserted into the end of the collar facing away from the flange so that a portion of the filler neck protrudes from the collar. The protruding portion should be able to provide sufficient space for the resin to be introduced. Now, a first clamp is attached in the area of the free end of the collar so that the free end and the filler neck are clamped tight in such a way that, in the next step, the resin can be introduced through the open filler neck at the top. Subsequently, a second clamp is attached in the area of the upper end of the filler neck for clamp closing the filler neck and for air-tight closure of the introduction chamber. Subsequently, the first clamp can be removed whereby the introduction chamber can be opened at the bottom, the resin can be introduced into the chamber and the resin-absorbing layer can be impregnated with the resin.

In a preferred embodiment, the air is evacuated via a valve in the sleeve. Preferably a protective element for protecting the valve against the resin within the sleeve can be provided in the area of the valve. Preferably the protective element is positioned prior to inserting the lining module into the sleeve in the area of the valve. Thus clogging or blocking of the valve with resin can be prevented during the impregnation. A strip of fabric, in particular felt, can be used in the area of the valve opening as a protective element.

When evacuating air from the chamber it is advantageous if the first pressure value is a negative pressure. Advantageously the second pressure value is the pressure of the ambient. To be able to achieve evacuation of the air and thus the vacuum, the sleeve is preferably provided with a closable valve.

The apparatus of the present invention for carrying out the method according to the present invention for impregnating a lining module is characterized by a kit containing a sleeve, an auxiliary introduction device, a sealing device and a blocking device. Preferably the kit exclusively includes the sleeve, the auxiliary introduction device, the sealing device and the blocking device.

The kit including only a few auxiliary devices facilitates, in a simple manner, the impregnation of the lining module with resin. It has turned out to be particularly advantageous if this kit is combined in a space-saving manner and packaged as a set which is easy to use on site.

In a preferred embodiment, the sleeve includes an opening for introducing at least a portion of the lining module into the sleeve. It is thus not absolutely necessary to introduce the lining module fully into the sleeve. In case the lining module is provided with an air-tight layer on the outside, for example, it is sufficient to introduce the lining module into the sleeve only in the area of the flange. In the same way, it may be sufficient for a T-shaped lining module to cover only two tube-shaped ends with the sleeve and to provide the third tube-shaped end with the auxiliary introduction device.

To facilitate simple evacuation of air from the chamber, the sleeve has a valve, in particular a closable valve. Furthermore, the auxiliary introduction device can contain a filler neck, in particular in the form of a hollow body. The sealing device advantageously contains an adhesive band and/or the blocking device contains at least one clamp. In particular, the blocking device contains a set of two or more clamps.

Other features which are considered as characteristic for the invention are set forth in the appended claims.

Although the invention is illustrated and described herein as embodied in a method and an apparatus for impregnating a lining module provided with a resin-absorbing layer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
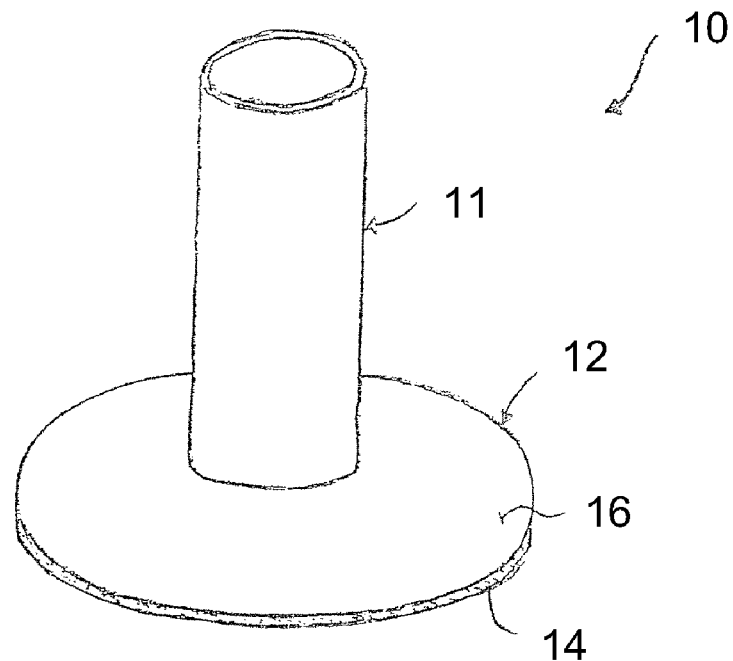
FIG. 1 is a diagrammatic, perspective view of a first lining module according to the invention.

Referring now to the figures of the drawing in detail and first, particularly, to FIG. 1 thereof, there is shown a perspective view of a first embodiment of a lining module 10. The lining module 10 is also referred to as a hat and is used as a lining in the area of the connection of a branch line to a main line to repair leaks in pipes.

Figure 2:
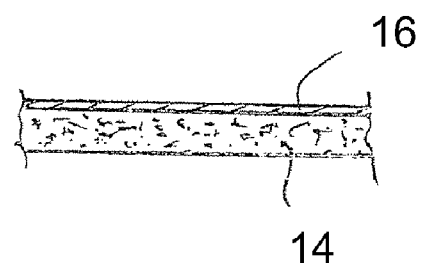
FIG. 2 is a cross-sectional view of the lining module according to FIG. 1.

A first end area of the lining module 10 is formed by a flange 12 and a second end area of the lining module 10 is formed by a collar 11. FIG. 2 shows the laminar structure of the lining module 10, wherein a resin-absorbing inner layer 14, such as of glass fiber fabric, and an outer layer 16 are provided. The outer layer 16 is air-tight and is of PU or PVC and is applied, for example, on the resin-absorbing layer 14 by calendaring.

To be able to bond the lining module 10 at the intended place to the inner wall of the main pipe and/or the branch pipe at a later point in time, the resin-absorbing layer 14 is impregnated with resin with the aid of the method shown below. After inserting the lining module 10 into the pipe, the resin hardens and a fixed bond is achieved between the lining module 10 and the inner wall of the pipe.

To carry out the method according to the present invention for impregnating the lining module 10, an apparatus of a kit type is provided containing a sleeve 20, an auxiliary introduction device 30, a sealing device 50 and a blocking device 40.

In the present exemplary embodiment, the sleeve 20 is a plastic foil, formed to be closed with the exception of an opening 22. The opening 22 is provided with an edge seam 24. The sleeve 20 further contains a closable valve 28.

The auxiliary introduction device 30 is formed by a tube-like plastic foil body containing a first end 32 and a second end 34. The blocking device 40 has a first clamp 42 and a second clamp 44. The sealing device 50 is formed as an adhesive band. Furthermore, to carry out the method, a sufficient amount of resin 60 is needed, wherein the resin 60 need not be part of the kit.

Figure 3:
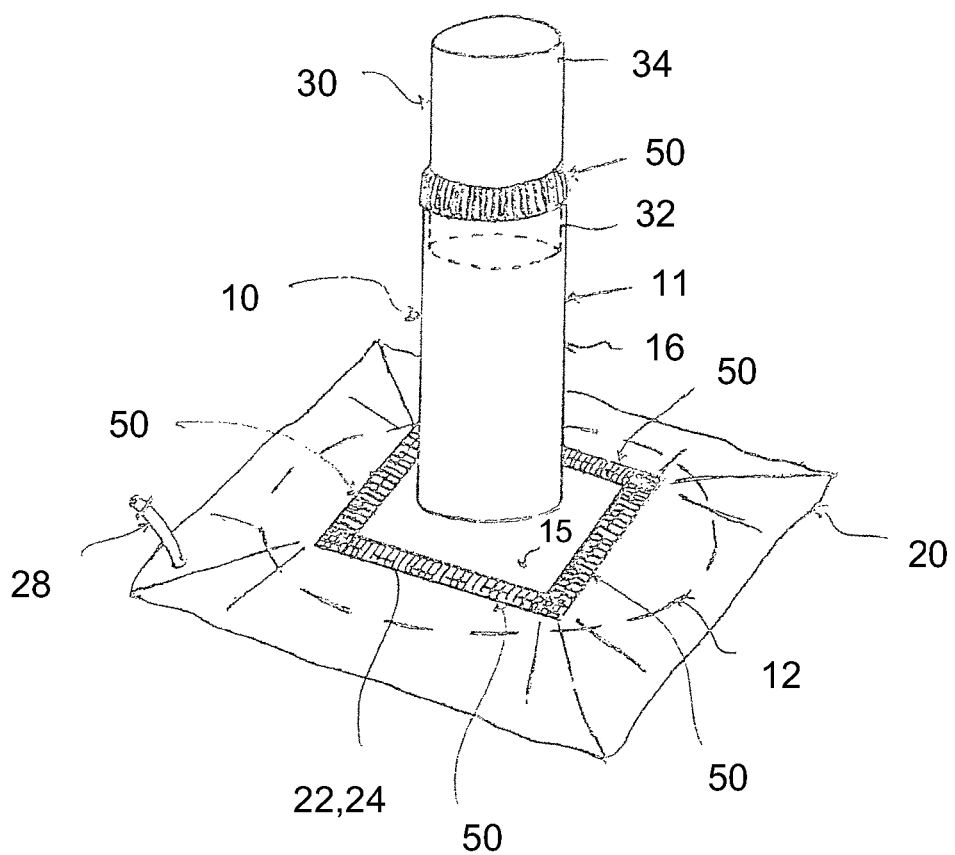
FIG. 3 is a diagrammatic, perspective view of the lining module according to FIGS. 1 and 2, partially introduced into a sleeve and provided with an auxiliary introduction device.
Figure 4:
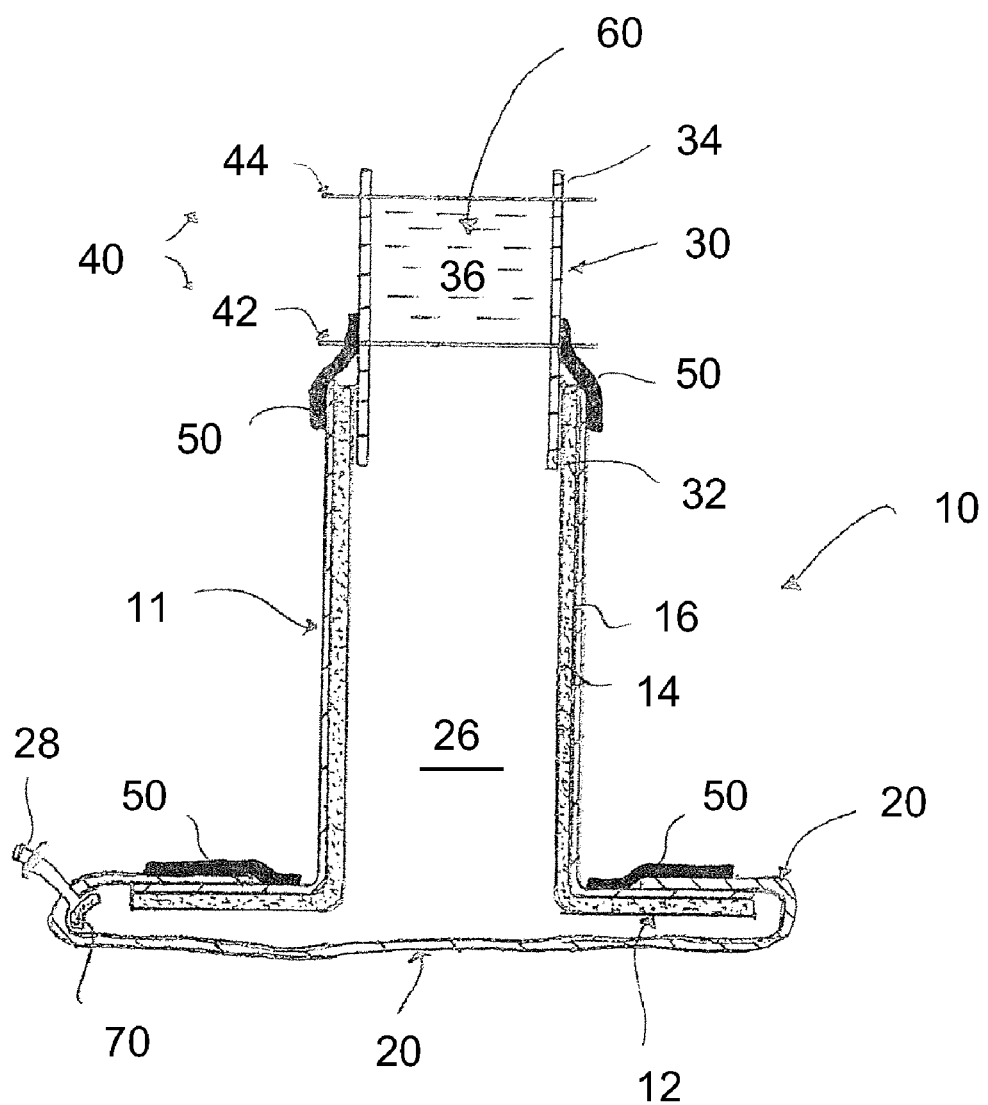
FIG. 4 is a cross-sectional view of the lining module according to FIG. 3.

With reference to FIGS. 3 and 4, a first preferred variant of the method according to the present invention will be described in the following for impregnating the lining module 10 provided with the resin-absorbing layer 14. First, the flange 12 as the first end area is introduced via the opening 22 into the sleeve 20 having an air-tight plastic foil, so that the flange 12 is completely within the sleeve 20, but collar 11 protrudes upward through opening 22. Then, the transition between the sleeve 20 and the flange 12 is closed in an air-tight manner in the area of edge seam 24 by applying an adhesive band being the sealing device 50 along the edge seam 24 so that an air-tight fixed connection of the outer layer 16 is created in the area of the flange with the sleeve 20. Optionally, the adhesive band 50 can also be bonded with the outer layer 16 in the area of collar 11.

Next, the auxiliary introduction device 30 is partially inserted into the collar 11, so that the first end 32 of the auxiliary introduction device 30 protrudes into the collar 11. The second end 34 of the auxiliary introduction device 30 forms a top free end. Subsequently, the auxiliary introduction device 30 is fixed to the collar 11. The fixing of the auxiliary introduction device 30 at the top end of the collar 11, which corresponds to the later introduction area of the resin, is achieved by the adhesive band serving as the sealing device 50. The adhesive band 50 is applied in the area of the transition of the top end of collar 11 and the auxiliary introduction device 30 on the outside of auxiliary introduction device 30, and the outer layer 16 so that air-tight closure of the transition is achieved.

In a next step, the first clamp 42 of the blocking device 40, only schematically indicated here, is attached in the area above the top end of collar 11 on the auxiliary introduction device 30 in such a way that a chamber 26 formed by the sleeve 20, the lining module 10, the auxiliary introduction device 30 and the first clamp 42 is closed in an air-tight manner. In the area of the collar 11, the air-tight outer layer 16 serves as an air-tight closure towards the outside.

Then, the air present in chamber 26 is evacuated by the valve 28, so that a first pressure value is prevalent within chamber 26. The objective of this evacuation of air is that as little air as possible remains in the capillaries of the resin-absorbing layer 14 consisting of a glass fiber fabric and a vacuum is created. After evacuating the air, the valve 28 is closed.

Subsequently, the resin 60 is introduced via the top, open end of the auxiliary introduction device 30 into the auxiliary introduction device 30 providing an introduction chamber 36. After completion of the introduction process, a second clamp 44 is attached in the area of the upper free end 34 of auxiliary introduction device 30. In the introduction chamber 36, a second pressure value is prevalent, which is different from the first pressure value. In the present example, the second pressure value corresponds to the pressure of the ambient. This state is shown in FIG. 4.

Subsequently, the first clamp 42 is released and the resin 60 is introduced from the introduction chamber 36 into the chamber 26 with the aid of the pressure differential between the first and second pressure value and, additionally, with the aid of gravity, wherein the resin-absorbing layer 14 is impregnated with resin 60. Due to the vacuum present in chamber 26, the resin 60 is sucked deeply into the capillaries of the glass fiber tissue of the resin-absorbing layer 14. To be able to utilize as well as possible the pressure differential between the introduction chamber 36 and the chamber 26, the second clamp 44 remains closed in this process step.

Figure 5:
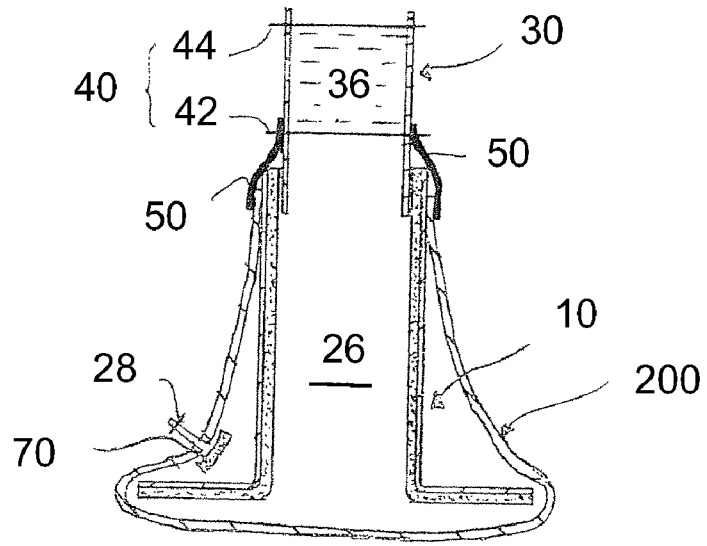
FIG. 5 is a diagrammatic, cross-sectional view of the lining module according to FIGS. 1 and 2, fully introduced into a sleeve and provided with an auxiliary introduction device.
Figure 6:
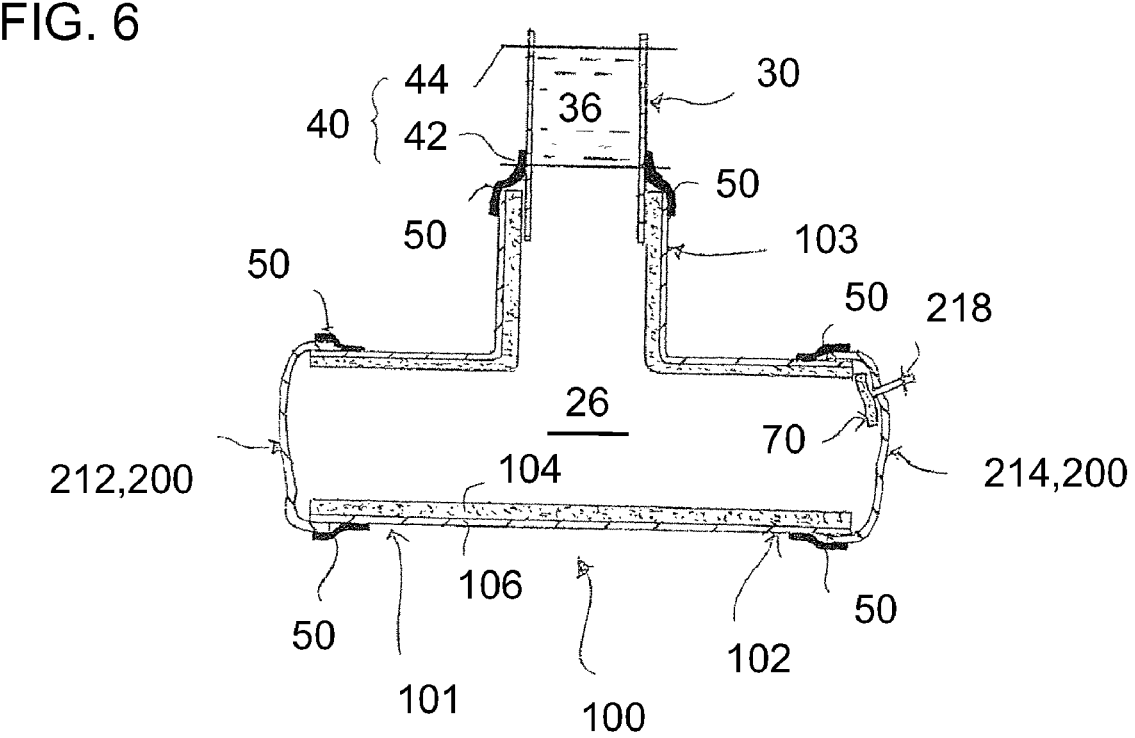
FIG. 6 is a diagrammatic, cross-sectional view of a second, T-shaped lining module partially introduced into a second sleeve and provided with a second auxiliary introduction device.

In order to ensure evacuating of the air via the valve 28, a protective element 70 can be provided within the sleeve 20 in the area of valve 28 (see FIGS. 4 to 6). Advantageously, the protective element 70 is positioned in the area of the valve 28 prior to the introduction of the lining module 10 within the sleeve 20. Clogging or blocking of the valve 28 with the resin 60 can thus be prevented during the impregnation process. As the protective element 70, a strip of fabric, in particular felt, can be provided in the area of the valve opening.

After the resin has been received in the resin-absorbing layer 14, the adhesive bands 50 and the auxiliary introduction device 30 are removed, and the lining module 10 is taken out of the sleeve 20. Before the lining module 10, now impregnated with resin 60, is introduced into the pipe to be repaired, it is reversed, so that the layer 14 impregnated with resin is on the outside.

FIG. 5 shows a further exemplary embodiment wherein the lining module 10, the auxiliary introduction device 30, the blocking device 40 and the sealing device 50 according to FIGS. 1 and 2 are used, however with a different sleeve 200. The sleeve 200 thus has a larger surface, or a larger volume, and has a size enabling the lining module 10 to be fully or in large parts introduced into the sleeve 200. FIG. 5 shows a state in which the lining module 10 is already introduced into the sleeve 200 and the transition between the sleeve 200 and the auxiliary introduction device 30 is closed in an air-tight manner by an adhesive band as the sealing device 50. The remaining components and the associated process steps can be derived from the above explanations with reference to FIGS. 1 to 4.

FIG. 6 shows a further exemplary embodiment with a lining module 100 having a first pipe end 101, a second pipe end 102 and a third pipe end 103. The lining module 100 has a laminate structure corresponding to FIG. 2 with a resin-absorbing layer 104 and an outer layer 106. In contrast to FIGS. 1 to 5, a sleeve 210 used in FIG. 6 has a first portion 212 and a second portion 214. The first portion 212 is used to close off the first pipe end 101 in an air-tight manner. For this purpose, after partially inserting first pipe end 101 into the sleeve portion 212, an adhesive band is applied as the sealing device 50 in the transition area. Furthermore, the second sleeve portion 214 is applied in the area of the second pipe end 102 and adhesively bonded in an air-tight manner with the outer layer 106 of the second pipe end 102. The second sleeve portion 214 contains a corresponding valve 218 for the later evacuation of air. The auxiliary introduction device 30 is partially inserted in the open end of third pipe end 103 and fixed to the outer layer 106 of the third pipe end 103 by the adhesive band 50 in an air-tight manner. The remaining components of the exemplary embodiment shown in FIG. 6 correspond to the components of the exemplary embodiment according to FIGS. 1 to 4.

After attaching the sleeve 210 and the auxiliary introduction device 30 on the lining module 100, the first clamp 42 is applied in an analogous fashion as explained with reference to FIGS. 3 and 4, the resin 60 is introduced into the introduction chamber 36, and the second clamp 44 is attached at the top end of the auxiliary introduction device 30. After a vacuum has been created within the chamber 26 by evacuating air via the valve 218, the first clamp 42 is released. The resin 60 can thus pass into the chamber 26 and impregnate the resin-absorbing layer 14.

In all above explained exemplary embodiments, as an alternative to the combined use of the pressure differential between the first and second pressure value and the force of gravity, a variant can be chosen in which only the pressure differential, without the additional help of the force of gravity, can be used to impregnate the resin-absorbing layer 14 with the resin 60.

The invention claimed is:

1. A method for impregnating a lining module having a resin-absorbing layer and used for repairing a pipe, the method comprises the steps of:
    inserting at least one end portion of the lining module equipped with the resin-absorbing layer and an air-tight, outer coating into an air-tight sleeve;
    fixing an auxiliary introduction device on an introduction area of the lining module;
    air-tight closing transition areas between the lining module and the air-tight sleeve and between the introduction area and the auxiliary introduction device by means of at least one sealing device;
    air-tight closing of the auxiliary introduction device with respect to the ambient by providing a releasable blocking device such that a chamber formed by the air-tight sleeve, the auxiliary introduction device and also the lining module is closed in an air-tight manner and that an introduction chamber, accessible from an outside, is formed for filling with resin;
    evacuating air from the chamber such that a first pressure value is present within the chamber;
    introducing the resin into the introduction chamber, in which a second pressure value, different from the first pressure value, is present; and
    releasing the blocking device so that the resin is introduced from the introduction chamber into the chamber with an aid of a pressure differential between the first and the second pressure values thus resulting in the resin-absorbing layer of the lining module being impregnated with the resin.

2. The method according to claim 1, wherein:
    one of a flange and a first pipe end of the lining module forms at least one of the first end area and a collar; and
    a second pipe end of the lining module forms the introduction area.

3. The method according to claim 1, which further comprises fixing the auxiliary introduction device on the introduction area of the lining module by inserting the auxiliary introduction device into the introduction area.

4. The method according to claim 1, which further comprises providing a filler neck as the auxiliary introduction device.

5. The method according to claim 1, which further comprises:
    providing an adhesive band as the sealing device; and
    providing at least one clamp as the blocking device.

6. The method according to claim 1, which further comprises forming the introduction chamber from the auxiliary introduction device and the blocking device.

7. The method according to claim 1, which further comprises:
    evacuating the air through a valve in the sleeve; and
    providing a protective element in an area of the valve to protect the valve against the resin within the sleeve.

8. The method according to claim 1, which further comprises generating the first pressure value to be a negative pressure.

9. The method according to claim 1, which further comprises forming the second pressure value to be ambient pressure.

10. The method according to claim 4, which further comprises providing a hollow body as the filler neck.

11. The method according to claim 1, which further comprises using gravity to assist in moving the resin from the introduction chamber into the chamber.

* * * * *